(No Model.)

R. McFEDRIES.
INSECT EXCLUDER FOR BEDSTEADS.

No. 421,604. Patented Feb. 18, 1890.

Witnesses.
Arthur Ashley
James P. Duhamel

Inventor
Robert McFedries
per [signature] atty.

UNITED STATES PATENT OFFICE.

ROBERT McFEDRIES, OF PUEBLO, COLORADO.

INSECT-EXCLUDER FOR BEDSTEADS.

SPECIFICATION forming part of Letters Patent No. 421,604, dated February 18, 1890.

Application filed September 24, 1889. Serial No. 324,978. (No model.)

*To all whom it may concern:*

Be it known that I, ROBERT MCFEDRIES, a citizen of the United States, residing in the city of Pueblo, in the county of Pueblo, in the State of Colorado, have invented a new and useful Insect-Excluder for Bedsteads, of which the following is a correct description.

The object of the invention is to provide a protecting attachment for bedsteads, cribs, and the like, which shall be quickly and easily applied thereto and as readily detached therefrom, and which when in place shall operate to effectually prevent the intrusion of all creeping wingless insects.

Figures 1, 2:
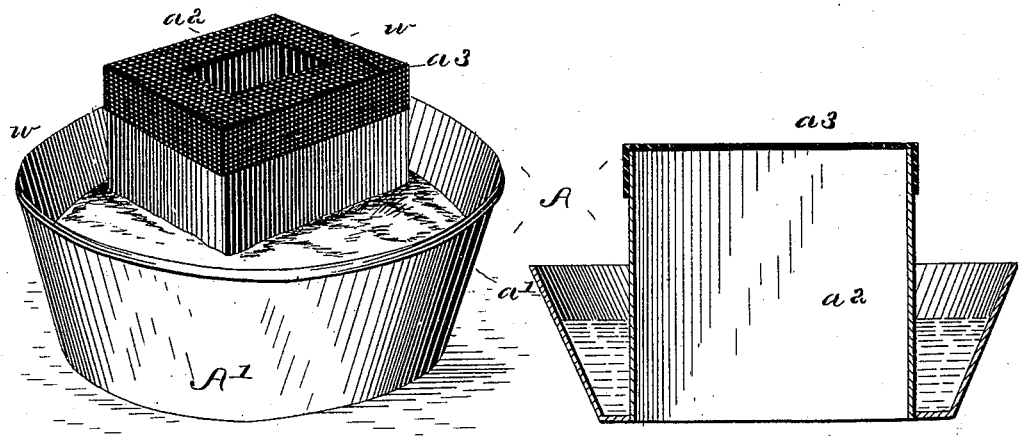
Figure 3:
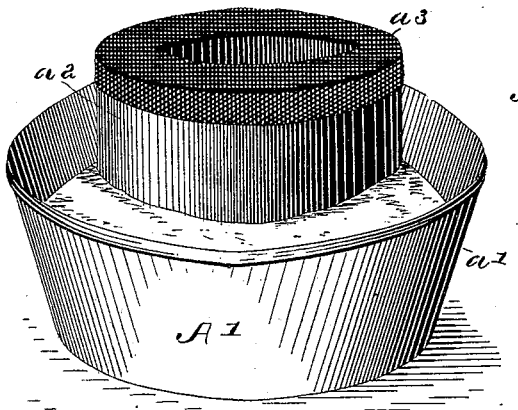
Figure 4:
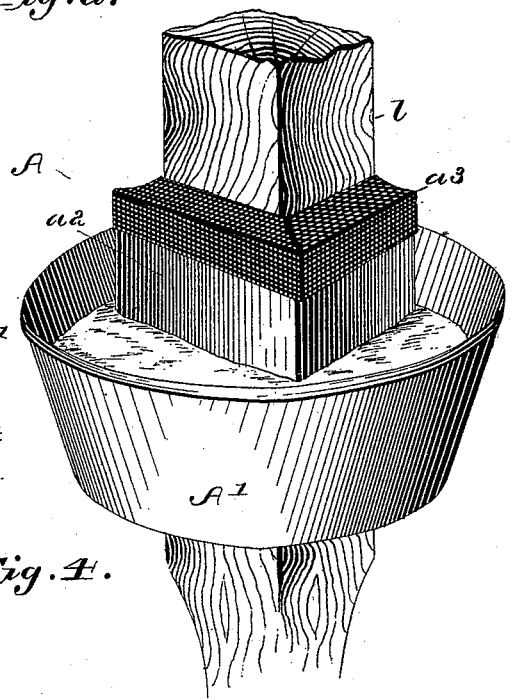

In the accompanying drawings, Figure 1 represents, in perspective, a view of my improved excluding attachment in one of its forms. Fig. 2 is a vertical central section through the body of the attachment, as in the line $w$ $w$ in Fig. 1. Fig. 3 is a view in perspective, similar to that seen in Fig. 1, representing a modification in the construction of the central portion of the attachment. Fig. 4 is a perspective view showing the excluding attachment as applied for use.

In each of the figures the excluding attachment A consists of an inclosing fluid-containing vessel $A'$, which is composed of an outer wall $a'$, preferably flaring from its lower extremity upward and outward, a bottom or closing-plate $a$, which has a central opening, an inner wall or central trunk $a^2$, which rises vertically from the edge of the central opening and which is open at top and bottom, as shown, and an elastic closing and attaching band $a^3$, preferably composed of rubber, the lower portion of which is closely fitted around the upper extremity of the central trunk or wall $a^2$, and the upper portion of which, when the attachment is applied to use, closely clasps the leg of the bedstead or other article of furniture which it is desired to protect.

In operation, the leg $l$ of the bedstead being lifted from the floor, the attachment is passed upward over the lower extremity thereof, the securing-band being forcibly held out of engagement until the desired position has been reached, when it is permitted to snap into place and to contract tightly around the body of the leg. The vessel $A'$ being then supplied with water or other suitable fluid, the incursions of chinches and other creeping insects will be prevented, first, by the overhang of the outer wall of the inclosing-vessel; secondly, by the barrier presented by the liquid contents of the vessel, and, thirdly, by the elastic band or spring $a^3$, which engages the legs so closely as to prevent the upward passage of any insects which might find their way into the narrow space between the body of the leg and the coincident embracing wall or central trunk $a^2$ of the attachment.

It will be seen that the excluder in its relation to the leg is entirely independent of a caster and of any other means of facilitating the locomotion of the bedstead or crib to which it is applied, and that a caster may be applied or removed at will without interference in any way with the described self-securing excluding attachment.

The invention having been thus described, what is claimed is—

The described insect-excluder, consisting essentially of the vertical trunk having central passage, the contractible securing-band upon the upper extremity of the trunk, and the vessel around the base of the same.

ROBERT McFEDRIES.

Witnesses:
   WM. L. HARTMAN,
   AUGUSTUS N. KELLER.